US012243327B2

(12) United States Patent
Arditi

(10) Patent No.: US 12,243,327 B2
(45) Date of Patent: Mar. 4, 2025

(54) GENERATION AND UPDATE OF HD MAPS USING DATA FROM HETEROGENEOUS SOURCES

(71) Applicant: Lyft, Inc., San Francisco, CA (US)

(72) Inventor: Gil Arditi, Palo Alto, CA (US)

(73) Assignee: Lyft, Inc., San Francisco, CA (US)

( * ) Notice: Subject to any disclaimer, the term of this patent is extended or adjusted under 35 U.S.C. 154(b) by 5 days.

(21) Appl. No.: 18/054,844

(22) Filed: Nov. 11, 2022

(65) Prior Publication Data
US 2023/0132889 A1    May 4, 2023

Related U.S. Application Data

(63) Continuation of application No. 15/811,489, filed on Nov. 13, 2017, now Pat. No. 11,537,868.

(51) Int. Cl.
| | |
|---|---|
| *G06V 20/58* | (2022.01) |
| *G01C 21/00* | (2006.01) |
| *G01C 21/32* | (2006.01) |
| *G05D 1/00* | (2024.01) |
| *G06F 16/29* | (2019.01) |

(Continued)

(52) U.S. Cl.
CPC ............ *G06V 20/58* (2022.01); *G01C 21/32* (2013.01); *G01C 21/3841* (2020.08); *G01C 21/3878* (2020.08); *G05D 1/0274* (2013.01); *G06F 16/29* (2019.01); *G06N 3/08* (2013.01); *G06N 20/00* (2019.01)

(58) Field of Classification Search
CPC ............ G01C 21/32; G01C 21/3841; G01C 21/3878; G05D 1/0274; G06F 16/29; G06F 18/00; G06N 3/08; G06N 20/00; G06V 20/58

USPC ........................................... 706/20
See application file for complete search history.

(56) References Cited

U.S. PATENT DOCUMENTS

2008/0062287 A1 *  3/2008  Agrawal ............... H04N 23/73
                                                         348/E5.037

FOREIGN PATENT DOCUMENTS

WO    WO-2016130719 A2 *  8/2016  ............ B60W 30/10

OTHER PUBLICATIONS

Yasrab et al., An Encoder-Decoder Based Convolution Neural Network (CNN) for Future Advanced Driver Assistance System (ADAS), Applied Sciences, Mar. 17, 2017.*

(Continued)

*Primary Examiner* — Aniss Chad
*Assistant Examiner* — Shien Ming Chou
(74) *Attorney, Agent, or Firm* — Baker Botts L.L.P.

(57) ABSTRACT

In one embodiment, a method includes a computing system collecting first sensor data, of a particular geographic location, from a first type of sensor. The computing system may process the first sensor data to identify one or more first objects at the particular geographic location. The computing system may access an existing high-definition (HD) map associated with the particular geographic location. The existing HD map includes one or more second objects and is generating using second sensor data collected with a second type of sensor. The computing system may determine whether the one or more first objects are included in the existing HD map. In response to determining that the one or more first objects are not included in the existing HD map, the computing system may update the existing HD map to generate an updated HD map that includes the first objects and the second objects.

20 Claims, 10 Drawing Sheets

(51) Int. Cl.
*G06N 3/08* (2023.01)
*G06N 20/00* (2019.01)

(56) References Cited

OTHER PUBLICATIONS

Du, Car Detection for Autonomous Vehicle Lidar and Vision Fusion Approach through Deep Learning Framework, 2017 IEEE International Conference on Intelligent Robots and System, Sep. 2017 (Year: 2017).*
Sachan, Keras Tensorflow Tutorial: Practical Guide from Getting Started to Developing Complex Deep Neural Network, CV-Tricks.com, May 2017 (Year: 2017).*
Audebert, Fusion of Heterogeneous Data in Convolutional Network for Urban Semantic, JURSE 2017 Joint Urban Remote Sensing Event, Mar. 2017 (Year: 2017).*
Todas, Multimodal Machine Learning: A Survey and Taxonomy, arXiv, 2017 (Year: 2017).*
Feichtenhofer, Convolutional Two-Stream Network Fusion for Video Action Recognition, arXiv, 2016 (Year: 2016).*
Badrinarayanan, SegNet a Deep Convolutional Encoder-Decoder Architecture for Image Segmentation, arXiv, 2016 (Year: 2016).*

* cited by examiner

GENERATION AND UPDATE OF HD MAPS USING DATA FROM HETEROGENEOUS SOURCES

PRIORITY

This application is a continuation under 35 U.S.C. § 120 of U.S. patent application Ser. No. 15/811,489, filed 13 Nov. 2017, which is incorporated herein by reference.

BACKGROUND

Traditional maps that assist humans with navigation are typically two-dimensional and mainly concerned with the accuracy of layouts of the roads. The level of detail in traditional maps is sufficient for purposes of showing human drivers how to navigate from one location to another. While traditional maps may assist human drivers with navigation, the task of driving—including obeying traffic rules and avoiding any hazards—is left to the human drivers and unassisted by traditional maps.

In contrast to traditional human-driven vehicles, an autonomous vehicle is a vehicle that is capable of sensing its environment and driving autonomously with little to no human input. In order to get to a destination, an autonomous vehicle not only would need to know how to navigate to the destination, but also how to drive safely. Rather than relying on a human driver, an autonomous vehicle typically relies on high-definition (HD) maps to be aware of its current surroundings and what is ahead. Unlike traditional maps, HD maps typically have highly accurate, detailed three-dimensional models of roads and the surrounding environment, such as road edges, road dividers, curbs, shoulders, traffic signs/signals, poles, mail boxes, fire hydrants, and any other features of roads and nearby structures that may be pertinent for driving. Such level of detail typically is not obtainable from using satellite or aerial imagery alone, but require costly, laborious on-the-road data collection. Data are typically collected by a fleet of vehicles equipped with sensors. However, due to differences in the data-collection equipment, precision in the gathered data may suffer, which in turn may affect the accuracy of the HD generated based on the gathered data.

DESCRIPTION OF EXAMPLE EMBODIMENTS

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Figure 1:
FIG. 1 illustrates an example of a conventional map.
Figure 2:
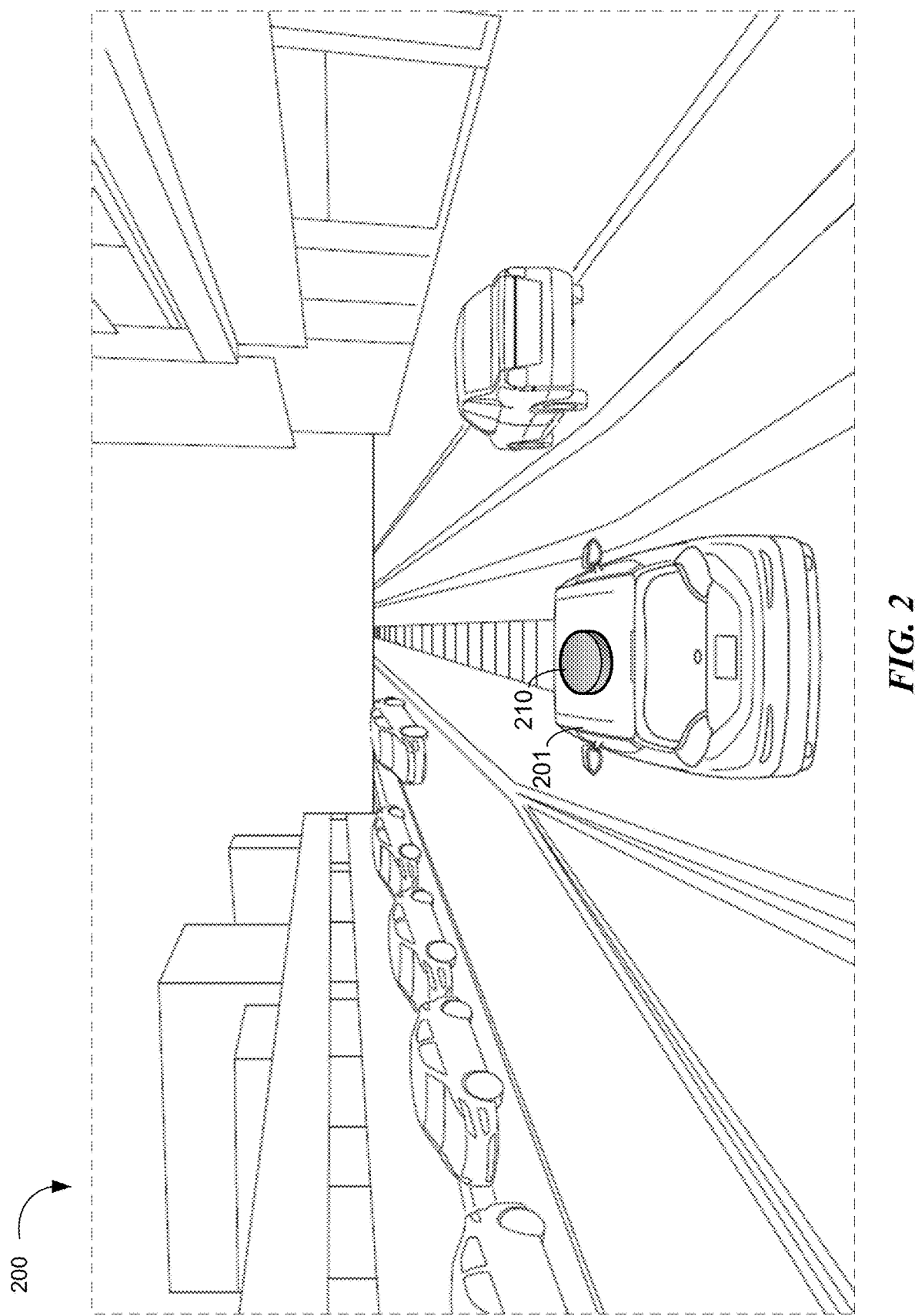
FIG. 2 illustrates an example of a data-gathering vehicle with a mounted sensor at a particular location.

Subject matter described herein is generally directed to generating and updating HD maps using data from different, heterogeneous sources. As described above, HD maps may be used by autonomous vehicles for driving and navigation, and as such, HD maps need to include highly accurate and detailed information to ensure the safe operation of autonomous vehicles. In particular embodiments, a HD map may be generated using data from a variety of sources. For example, information pertaining to the general layout of roads may be based on conventional maps, or any other suitable information source, such as satellite imagery, aerial imagery, and/or municipal data. FIG. 1 illustrates an example of a conventional map 100. More precise road-level information and three-dimensional modeling of the roads' surroundings may be gathered by, e.g., having data-gathering vehicles drive through the roads of interest and use sensors mounted on those vehicles to measure the surroundings. FIG. 2 illustrates an example scenario 200 of a data-gathering vehicle 201 with a mounted sensor 210. The types of sensors used for gathering data may include, for example, Light Detection and Ranging (LiDAR) sensors, optical cameras, infrared cameras, radars, ultra sound sensors, wheel sensors (e.g., for measuring distance), global positioning systems (GPS), inertial measurement units, accelerometers, gyroscopes, odometer systems, and/or any other suitable sensor types. The data-gathering vehicle 201 may be equipped with any combination of sensors configured/mounted in any suitable way. Differences between data-gathering equipment may be especially pronounced in situations where data from different operators are pooled to generate an HD map. For example, different fleet operators with different data-gathering vehicles 201 may utilize the same map-generation platform for gathering data and generating HD map, in accordance with particular embodiments. In particular embodiments, the vehicle 201 may be one that is specifically designed for and tasked with data collection, as well as a traditional human-driven vehicle and/or autonomous vehicle dispatched by a transportation management system while servicing ride requestors in a ride-sharing system. In particular embodiments, the detailed road-level information gathered by the sensors, together with the corresponding road-layout information, may be used to generate the three-dimensional model of a HD map.

To cover the vast number of roads and driving distances in a typical area of interest (e.g., especially in urban areas), a large number of data-gathering vehicles may be utilized. Since the data-gathering vehicles and their sensors may not necessarily be homogeneous (to be described in further detail below), consistency and precision in the gathered data may suffer. For example, different data-gathering vehicles may have different equipment configurations, so even if every vehicle is accurately gathering data, the baseline data would not necessarily be consistent. Discrepancies in the data may in turn affect the accuracy of the HD map, since the HD map is generated using the gathered data. As previously described, achieving high accuracy in the HD map is of significant importance, as autonomous vehicles rely on HD maps to drive and navigate safely.

Figure 3A:
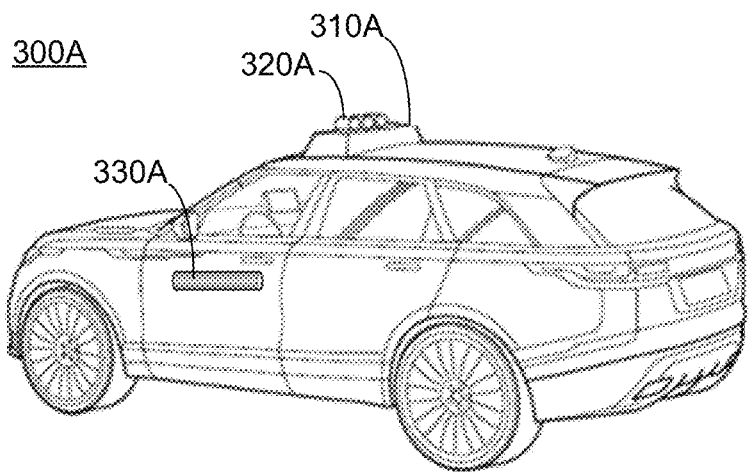
FIGS. 3A and 3B illustrate examples of potential differences between data-gathering vehicles.
Figure 3B:
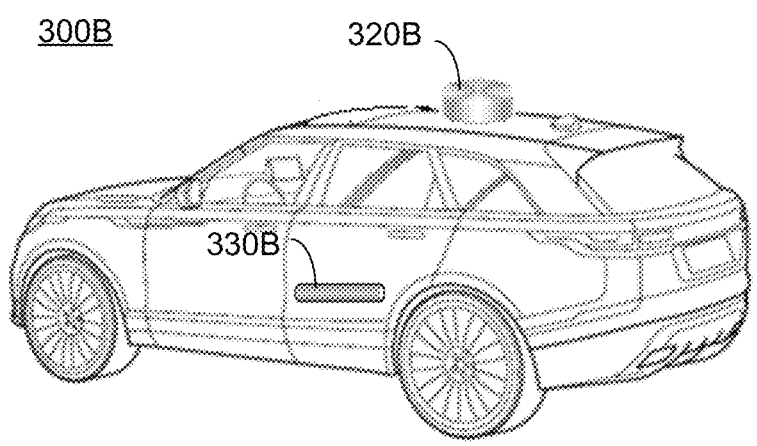

FIGS. 3A and 3B illustrate examples of potential differences between data-gathering vehicles. As represented by the sensors 320A and 320B of vehicles 300A and 300B, respectively, data-gather vehicles may have different types of sensors (e.g., LiDARs, cameras, radars, etc.), each with its unique strengths and weaknesses. Not only may the sensor types differ (e.g., LiDAR vs. camera vs. radar), the particular model, capability, age, condition, calibration, and/or configuration of each sensor may also differ from another sensor of the same type (as used herein, "sensor type" refers to a category of sensors designed for capturing a particular type of sensory information, such as LiDAR data from a LiDAR and images from a camera; differences in "sensor type" is therefore limited to such categorical differences and does not include differences in specific models, configurations, or setup of the same type of sensor). Further, the manner in which the sensors are mounted on the vehicles may also differ from one vehicle to the next. For example, the sensors 320A and 330A of vehicle 300A are mounted more towards the front of the vehicle 300A relative to sensors 320B and 330B of vehicle 300B. Even if the sensors are mounted in the same general location of their respective vehicles (e.g., the top or side of the vehicle), the sensors may not be oriented or positioned in precisely the same way (e.g., one may be positioned slightly higher and oriented more to the left than the other). The difference in sensor positioning may also be attributable to potential differences in the mounting rack, which may differ from vehicle to vehicle. For example, the sensors 320A of vehicle 300A is mounted on a mounting rack 310A, whereas the sensor 320B of vehicle 300B is mounted directly on the vehicle (or on a slim-profile mounting rack, such as a mounting plate, that is not visible in FIG. 3B). Furthermore, the vehicles themselves may be different (vehicle difference not shown in FIGS. 3A and 3B). For example, the vehicles may also differ in terms of type, model, make, year, and condition (e.g., tire size or pressure may also be a factor). Vehicle differences may be further pronounced in embodiments where the data-gathering vehicles include vehicles owned by individual users of a transportation management system (e.g., the vehicles of ride providers, as described in further detail below). Furthermore, environmental conditions under which data is gathered may also differ, since lighting, weather, visibility, air quality, and other environmental conditions that may affect sensor measurements are constantly changing. These differences, if not properly accounted for, may affect the accuracy of the resulting HD map.

Since autonomous vehicles rely on HD maps to drive and navigate safely, the map's accuracy is important. To address the issue of sensor data being gathered by potentially heterogeneous equipment and/or under heterogeneous environments, the various embodiments described herein provide systems, methods, and apparatuses that utilize machine-learning to automatically account for differences in sensor data attributable to any of the above non-exhaustive examples of potential causes. At a high-level, the machine-learning model in particular embodiments may learn how data gathered using real-world equipment (which as described above may differ in a variety of ways) relate to the desired HD map data, taking into consideration various contextual and environmental information associated with the data-gathering process. Once trained, the machine-learning model may take as input the sensor data from a particular vehicle along with any contextual/environmental information and transform the data into a common data space into which data from any vehicle may be mapped. Since data from every data-gathering vehicle may be mapped to this common space, discrepancies between the data would be reduced or minimized, which in turn may yield a more accurate HD map.

Figure 4:
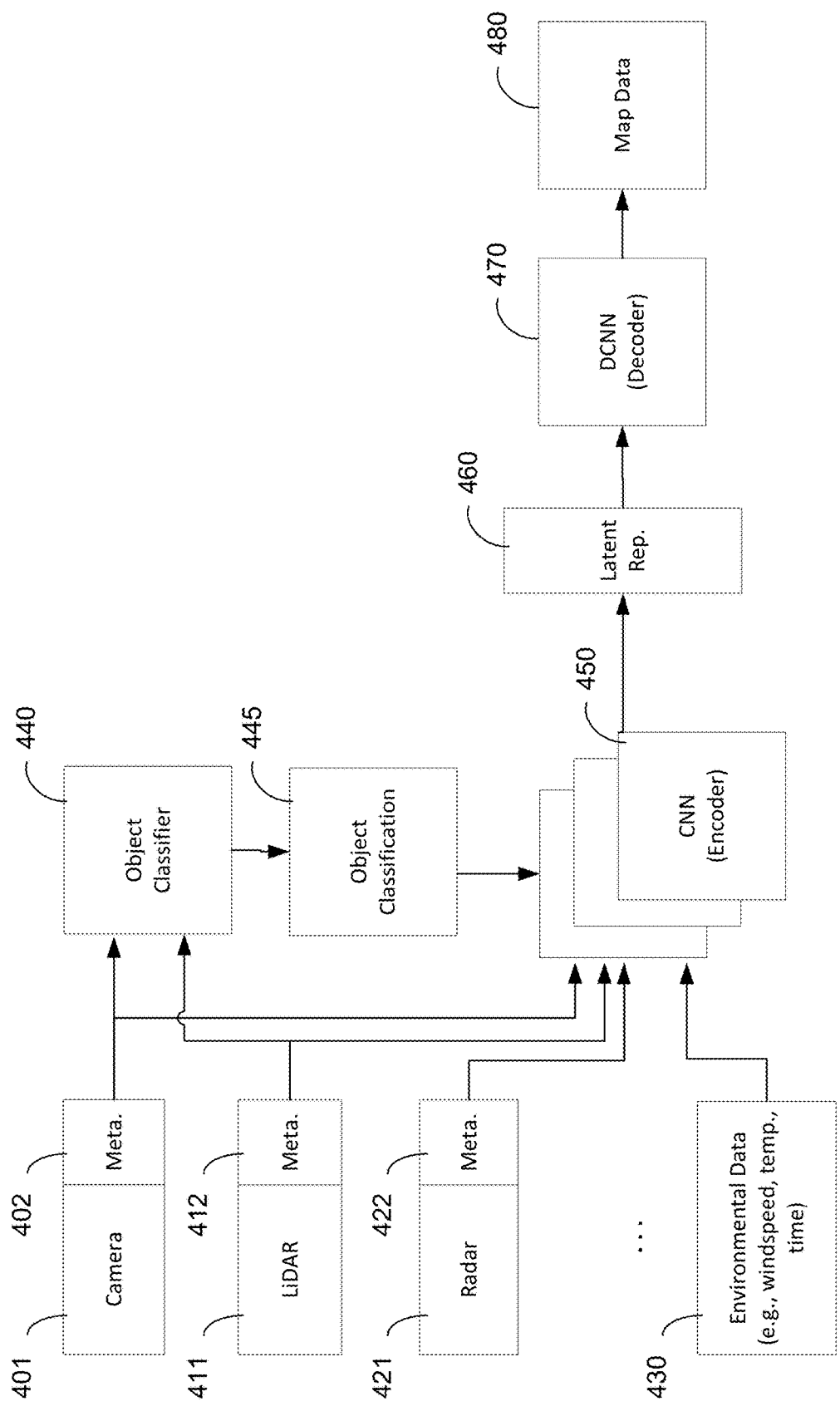
FIG. 4 illustrates an example machine-learning model architecture for transforming data received from data-gathering vehicles into HD map data.

FIG. 4 illustrates an embodiment of a machine-learning model architecture for transforming data received from different data-gathering vehicles into a common space 460 and using the transformed data to generate HD map data 480. The machine-learning model architecture may use any suitable neural network(s) (e.g., Recurrent Neural Network, Convolutional Neural Network, and/or Deconvolutional Neural Network, etc.) with any suitable components (e.g., episodic memory, pointers, and other operator components embedded in the larger neural network). At a high level, particular embodiments of the machine-learning architecture may use an encoder to encode sensor data into a common feature space, and then decode the encoded data into a desired space. To facilitate ease of understanding, FIG. 4 and the related descriptions use a convolutional neural network (CNN) 450 and a deconvolutional neural network (DCNN) 470 as examples of an encoder and a decoder, respectively. However, one of ordinary skill in the art would recognize that the encoder and decoder may be implemented using any other suitable model instead.

In particular embodiments, the machine-learning model that is to be trained may include any suitable encoder, such as one or more convolutional neural networks (CNN) 450, and any suitable decoder, such as a deconvolutional neural network (DCNN) 470, where the output of the encoder (e.g., CNN 450) is configured to be the input of the decoder (e.g., DCNN 470). The output of the CNN 450 may be referred to as a latent representation 460 of the data that is input into the DCNN 470. In particular embodiments, the latent representation 460 may be a vector of values in a latent data space, which may serve as a common space with reduced dimensionality into which different types of data from different data-gathering vehicles may be mapped. The process of transforming the input data of the CNN 450 into a latent representation 460 may also be referred to as encoding. Latent representation 460, without being processed by a trained DCNN 470, may not be meaningful to humans; however, the latent representation 460 may be processed or decoded by the trained DCNN 470 to generate HD map data 480. Again, while the embodiment illustrated in FIG. 4 uses convolutional and deconvolutional neural networks, any other suitable types or variations of machine-learning models may also be used, such as, for example, convolutional neural networks, recurrent neural networks, recursive neural networks, unsupervised pretrained networks, and/or any combination thereof.

The machine-learning model may be trained using any suitable training techniques, including using supervised machine learning to learn from labeled training data, unsupervised machine learning to learn from unlabeled training data, and semi-supervised machine learning to learn from both labeled and unlabeled training data. In particular embodiments where supervised machine-learning is used to train the machine-learning model, the training data set may include a large number of training samples (e.g., thousands or millions) gathered from various sources (e.g., data-gathering vehicles with different sensor configurations, equipment, etc.). In particular embodiments, each training sample may be associated with an instance of data captured by a data-gathering vehicle at a particular location. For example, at the particular location (e.g., at coordinates (x, y), latitude/longitude positions, etc.), a data-gathering vehicle may have gathered data in the training sample using its camera, LiDAR, radar, sonar, and/or any other suitable sensors as described herein. A training sample may further be associated with a known, target output, which in particular embodiments may be existing HD map data 480 at that particular location (x, y), which may include labeled segments or bounding boxes that indicate particular types of objects (e.g., curbs, walls, dividers, buildings, structures, etc.) in the HD map data. As an example, a labeled segment or bounding box may indicate that a known lane divider, for example, is within a boundary of a particular three-dimensional region in the HD map. In the context of training of the machine-learning model, the HD map data 480, which serves as the target or desired output for the associated training sample, may be referred to as the label for that training sample. Through training, the machine-learning model is iteratively updated to become better at recognizing relationships between feature patterns observed in the input training data and the corresponding target outputs (or labels). Once trained, the machine-learning model may be used to process a given input data, recognize the feature patterns of interest in the input data, and generate an output based on relationships between feature patterns and desired output learned from the training data. Thus, if the target or desired output for a training sample is the HD map data for a particular location, then the machine-learning model would learn to generate such HD map data based on feature patterns found in the input data. If the target or desired output further includes labeled segments or bounding boxes of known objects, the HD map data output by the machine-learning model would further includes such information if corresponding feature patterns are founded in the input data.

In particular embodiments, the HD map data 480 used as the target or desired output may be obtained from any existing, reliable HD map source, such as commercially available HD maps or HD maps generated using precise sensor measurements. The underlying sensor data used for generating such HD map data 480 may have been generated using the same data-gathering equipment (e.g., the same data-gathering vehicle) or homogenous equipment (e.g., identically equipped and configured data-gathering vehicles), and as such the cost associated with gathering the underlying data may be high and the amount of data gathered may be less than what could otherwise be gathered using diverse, heterogenous equipment.

In particular embodiments, during training, the training algorithm may iteratively process the training samples and update parameters of the CNN 450 (an example of an encoder) and DCNN 470 (an example of a decoder), with the goal of improving their ability to output HD map data similar to the target output HD map data 480 associated with the training samples. The iterative training process may continue until a convergence or loss-function condition is met (e.g., until the difference between a generated output and the target output (ground truth), is sufficiently small). Examples of loss functions include cross-entropy loss, hinge loss, Softmax loss, and Multiclass Support Vector Machine (SVM) loss. Any suitable training algorithm known to one skilled in the art may be used, including algorithms based on backward or forward propagation.

Once trained, the CNN 450 may be used to process data from a data-gathering vehicle and output a latent representation 460 of the data in latent space. The latent representation 460 may then be processed/decoded by the trained DCNN 470, which may output corresponding HD map data 480. Since the trained machine-learning model has been trained to transform input data into HD map data based on features of the input data, the trained machine-learning model may perform such transformations on input data associated with locations that are unassociated with any of the samples in the training data set.

In particular embodiments, the CNN 450 may be configured to take as input a variety of data captured at a particular location by a data-gathering vehicle. In particular embodiments, data captured by a data-gathering vehicle may be pre-processed (e.g., by software and/or by human) before being inputted into the CNN 450. For example, the data may be aggregated or particular data of interest may be extracted from the captured sensor data (e.g., motion information, object detection, etc.). The captured data may also be converted into alternative representations (e.g., as vectors or embeddings) to facilitate machine-learning computations.

Any suitable sensor data may be obtained and output by a sensor of a data-gathering vehicle. As used herein, sensor data refers to the output of a particular sensor of interest, such as camera, LiDAR, radar, etc. The sensor data from a particular sensor may be associated with metadata that provide contextual information relating to the sensor data and the sensor that output the sensor data. For example, the data-gathering vehicle may have obtained camera data 401, such as an image(s) or video frame(s), at that location using one or more cameras or optical sensors. The camera data 401, which is a type of sensor data, is output by a camera, which is a type of sensor. The camera data 401 may be associated with metadata 402 that provide contextual information relating to the camera data 401 and the particular camera used for capturing the camera data 401. The metadata 402 may include, for example, any combination of: the mounting location of the camera in three-dimensional space (e.g., represented by (x, y, z) coordinates) relative to a reference point (e.g., the center or a corner of a mount for the camera, a point projected from the center of the vehicle to the ground beneath it, etc.); the focal plane of the camera (e.g., represented by height, width, and depth); the orientation of the camera; the brand, model, and/or year of the camera; capabilities or specifications of the camera (e.g., resolution, focal distance, etc.); configurations of the camera (e.g., ISO, zoom length, etc.); information pertaining to the camera's mount (e.g., model, size, etc.), and any other pertinent data at the time the camera data 401 was obtained. In particular embodiments, the data-gathering vehicle may have also captured LiDAR data 411 at the same location using a LiDAR sensor. Similar to the camera data 401, the LiDAR data may also be associated with metadata 412 that provide contextual information relating to the LiDAR data 411 and the particular LiDAR used for capturing the LiDAR data 411. The metadata 412 may, e.g., include any combination of: the mounting location of the LiDAR in three-dimensional space relative to a reference point; the brand, model, and/or year of the LiDAR sensor; capabilities of the LiDAR (e.g., density and spacing information, laser type, sensor type); configurations (e.g., sensitivity and rotation speed); information pertaining to the LiDAR's mount (e.g., model, size, etc.); and any other pertinent data at the time the LiDAR data 411 was captured. Similarly, radar data 421 captured using a radar and associated metadata 422 may also be provided to the CNN 450 as input. The radar's metadata 422 may include any combination of, e.g.: the mounting location of the radar in three-dimensional space relative to a reference point; the radar's orientation; radar type; radio wave transceiver configurations; beam angle; information pertaining to the radar's mount (e.g., model, size, etc.); and any other pertinent data at the time the radar data 421 was captured. While FIG. 4 illustrates particular types of sensor data being input into the machine-learning model, the present disclosure contemplates any suitable data captured by any suitable equipment, including, e.g., infrared sensors, stereo vision sensors, wheel sensors, ultrasound sensors, global positioning system (GPS), inertial measurement units, accelerometers, gyroscopes, and/or odometer systems.

In particular embodiments, the CNN 450 may also be configured to receive environmental data 430 that describe the environment in which the sensor data (e.g., camera data 401, LiDAR data 411, radar data 421, etc.) were obtained. Each data-gathering vehicle may be associated with its own environment data 430, which would be generally associated with any sensor data output by any sensor of the vehicle. The environmental data 430 may include, for example, data relating to the data-gathering vehicle, such as its make, model, year, dimensions (e.g., length, width, and height), weight, tire size, tire pressure, mount locations, speed and/or vibration of the vehicle during data captured, and any other pertinent information that may affect measurement results. The environmental data 430 may also include, for example, visibility conditions, lighting measurements, temperature, wind speed, precipitation, and any other environmental conditions that may affect sensor measurements. The environmental data 430 may also include the time and date at which sensor data were obtained, since time and date may correlate with lighting conditions, which in turn may affect certain types of sensor measurements (e.g., cameras). In particular embodiments, the environmental data 430 or portions thereof may be included as the metadata of any of the specific sensor data types. For example, if lighting conditions could impact camera data 401, environmental data 430 relating to lighting (e.g., time and date, visibility condition, etc.) may be included as the camera's metadata 402. As another example, if precipitation could impact LiDAR data 411, environmental data 430 relating to precipitation may be included in the LiDAR's metadata 412.

In particular embodiments, the CNN 450 may also be configured to receive object classification information 445 generated based on any of the sensor data, since object classification information may be used in an HD map to identify objects of interest (e.g., curbs, walls, dividers, walls, etc.). For example, the camera data 401 and/or LiDAR data 411 may be provided to an object classifier 440 that is trained to detect certain objects of interest captured by such data. In particular embodiments, the object classifier 440 may be any suitable machine-learning model, such as a neural network, that is trained on a training data set of sample sensor data (e.g., camera and/or LiDAR data) with labeled objects. For example, each training data sample for camera images may include an image with regions or segments of pixels labeled as depicting certain known objects, such as lane dividers, curbs, etc. Similarly, each training data sample for LiDAR images may include a LiDAR data output with regions or segments labeled as corresponding to certain known objects. Once trained, the object classifier 440 may learn to detect objects in camera and/or LiDAR data, such as, e.g., debris on roads, pot holes, hazards, mail boxes, curbs, street signs, trees, construction zones, lane dividers or islands, ramps, and/or any other objects that may be of interest for an autonomous vehicle. By analyzing sensor data inputs (e.g., camera data 401 and/or LiDAR data 411), the object classifier 440 may output an object classification 445 indicating the type(s) of object likely to have been captured by the sensor data. In particular embodiments, the object classifier 440 may also segment the underlying sensor data and specify particular segments that correspond to the detected objects. For example, the object classifier 440 may take an image as an input, and generate output information that specify any number of pixel regions in the image (e.g., a geometric region in the lower left corner, a non-geometric region in center of the image, etc.) and their respective objects labels (e.g., mail box, tree, curb, etc.). The resulting object classification 445 (which may include segmentation information as well) may then be input into the CNN 450.

In particular embodiments, the CNN 450 may be a single neural network configured to receive multiple types of sensor data. For example, all the aforementioned input data may be provided to and processed by the single neural network. The single neural network would be trained to process a variety of data (e.g., camera data 401, LiDAR data 411, their respective metadata 402 and 412, environmental data 430, etc.) and encode them in a latent representation 460. In alternative embodiments, the CNN 450 may be configured as multiple discrete neural networks, with each discrete neural network receiving and processing a different type of sensor data. For example, each sensor data type (or a combination of several sensor data types) may be input into its own discrete neural network. For example, the camera data 401 and its metadata 402 may be input into a first neural network, the LiDAR data 411 and its metadata 412 may be input into a second neural network, and so on. Since each of the discrete neural networks may be trained to process a particular type(s) of sensor data, the associated metadata may also encompass pertinent environmental data 430 and/or objection classification results 445. In embodiments where multiple discrete neural networks are used, the machine-learning model may be configured to pool, concatenate, and/or aggregate the outputs of those networks to form the latent representation 460. As described elsewhere herein, the latent representation 460, which represents all the underlying input data, may be configured to be input into the DCNN 470, which in turn would be trained to output the corresponding HD map data 480.

Once CNN 450 and DCNN 470 have been trained, the machine-learning model may be used to generate HD map data using newly gathered sensor data and any associated metadata and environmental data. For example, at a particular location, a data-gathering vehicle may gather camera data 401 and associated metadata 402, LiDAR data 411 and associated metadata 412, and environmental data 430. Similar to the process used during training, the gathered data may be input into the trained CNN 450 (if CNN 450 includes multiple networks, each type of sensor data may be input into each respective network). In particular embodiments where the CNN 450 is configured to receive object classifications 445, the sensor data (e.g., camera data 401 and/or LiDAR data 411) may be input into the object classifier 440, and the resulting object classification 445 may be input into the trained CNN 450.

Based on the inputs, the CNN 450 may encode the input data as a latent representation 460, which may be associated with the location where the sensor data were captured. In particular embodiments, this latent representation 460 of the data may be stored and/or distributed to interested parties, such as autonomous vehicles. When desired, the systems of the interested parties with access to the latent representation 460 may convert it to HD map data 480 using the trained DCNN 470. In embodiments where the latent representation 460 is distributed to, for example, autonomous vehicles, the trained DCNN 470 may also be provided to such systems so that they may use the DCNN 470 to decode the latent representation 460. For example, when a latent representation 460 with updated information is sent to an autonomous vehicle, the autonomous vehicle may be instructed to use the latent representation 460 to update its locally-stored HD map. In response, the autonomous vehicle's computing system may decode the latent representation 460 using the locally-stored DCNN 470 to generate updated HD map data 480. The resulting HD map data 480 would be associated with the particular location at which the sensor data were captured. The vehicle may then use the generated HD map data 480 to update the vehicle's locally-stored HD map. In this fashion, HD map data 480 may be automatically generated, using the trained machine-learning model, for each location where sensor data was gathered and used to update HD maps.

Figure 5:
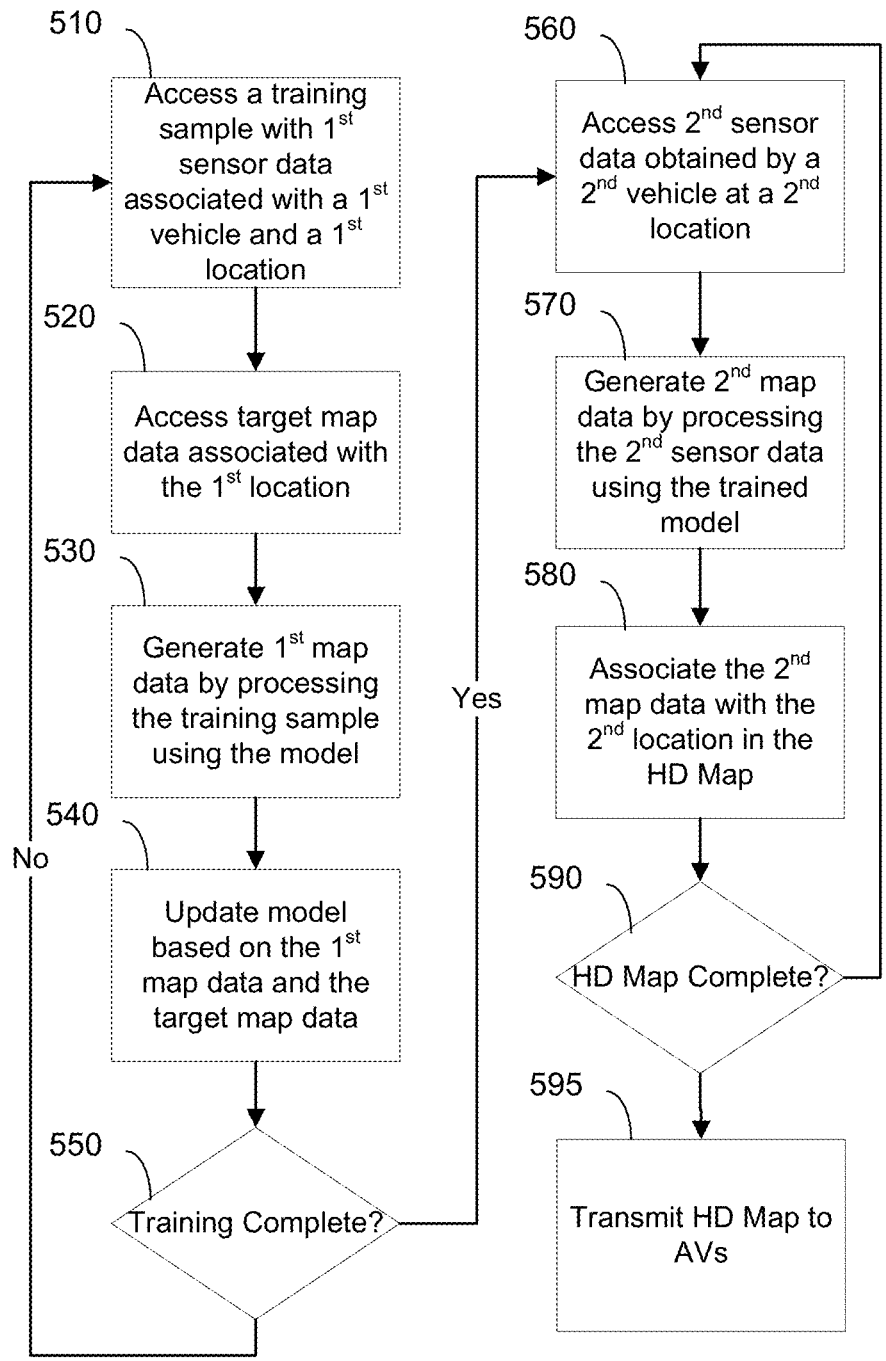
FIG. 5 illustrates an example method for generating HD maps.

FIG. 5 illustrates a method for generating HD maps in accordance with embodiments described herein. In particular embodiments, machine learning techniques may be used to automate the process for integrating different types of sensor data from different data-gathering vehicles. The machine-learning model may be trained on a training data set with a sufficiently large number of training samples, as described with reference to FIG. 4. The training process, as illustrated in FIG. 5, begins at step 510, at which a computing system may access a training sample from the training data set. The accessed training sample may include, e.g., sensor data obtained using a sensor of a data-gathering vehicle at a geographic location. As an example, the training sample may include camera data (e.g., images or videos) from a camera of a first data-gathering vehicle. In particular embodiments, the training sample may also include metadata associated with the camera data, such as information relating to the camera (e.g., spatial position, focal plane dimensions, etc.), as described in more detail with reference to FIG. 4. The training sample may further include other sensor data obtained from other sensors of the first data-gathering vehicle at the geographic location. For example, the training sample may also include LiDAR data and associated metadata. In particular embodiments, the training sample may also include environmental data associated with the time at which the sensor data were obtained. For instance, the environmental data may include, e.g., wind speed, temperature, precipitation, time of day, lighting condition, and/or visibility condition when the first data-gathering vehicle captured the sensor data in the training sample. In particular embodiments, the sensor data and/or environmental data may be the raw data output by their respective sensors, or they may have undergone pre-processing to filter out noise, consolidate/aggregate information, extract information, or any other suitable processing to prepare them for the machine-learning model.

In particular embodiments, sensor data in the training sample may be processed using an object classifier (not shown in FIG. 5) to determine the object classification of one or more objects of interest detected in the sensor data (e.g., roads, curbs, structures, hazards, etc.). For example, the object classifier may be a machine-learning model trained to detect objects in input data (e.g., images or videos) and output suitable object classifications that identify the types of objects detected. Each object classification may also be associated with a particular segment in the input data (e.g., a portion of the input image or video) to identify where the object is located. In particular embodiments, a training sample (e.g., the accessed training sample at step 510) may include object classification information generated from data in the training sample. For example, camera data in the training sample may be pre-processed to extract object classification information, and such information may be included in the accessed training sample during model training. In particular embodiments, the object classification process may occur during training. For example, during each training iteration, sensor data (e.g., images/videos) from the accessed training sample may be processed using the object classifier to generate object classification information. In either case, the object classification information associated with each training sample may be input into the machine-learning model for training.

At step 520, the computing system may access target map data associated with the geographic location associated with training sample accessed at step 510. As previously described with reference to FIG. 4, each training sample may be associated with a target (i.e., a desired output). The target map data may be the desired output that the machine-learning model is trying to learn to generate given the associated input data. In particular embodiments, the target map data may be obtained from an existing HD map, which may be from a trusted third-party provider or known to be generated using highly reliable, accurate data. In particular embodiments, the target map data may be stored in a database and associated with the accessed training sample, or the target map data may be queried from an HD map by specifying the geographic location (e.g., latitude and longitude coordinates) associated with the training sample.

At step 530, the system may train the machine-learning model using the training sample. In particular embodiments, the machine-learning model may be initialized with certain parameters, which may be randomly generated. Then during each training iteration, the computing system in general may generate map data by processing the accessed training sample using the machine-learning model in its existing state. Based on the generated map data and the target map data associated with the training sample, the computing system, at step 540, may then update the parameters in the model so that the map data generated in the subsequent iteration may improve (e.g., closer to the target map data associated with the training sample used in the next iteration).

Particular embodiments of the training process are now described for machine-learning models that include a convolutional neural network (CNN) and a deconvolutional neural network (DCNN), as described in further detail with reference to FIG. 4. In particular embodiments, machine-learning model may be configured so that the output of the CNN is made to be the input of the DCNN. During training, the computing system may input the training sample into the CNN for processing. The CNN may process the data in the training sample (e.g., camera data, LiDAR data, radar data, the associated metadata, as well as any other associated data, such as the aforementioned object classification), and generate a corresponding latent representation. The latent representation output may then be input into the DCNN, which in turn may process the latent representation and generate the map data (e.g., step 530). In particular embodiments, at step 540, the system may, conceptually, compare the generated map data and the target map data and update the parameters of the CNN and the DCNN to improve the predictive or inference abilities of the model. The system may utilize any suitable training algorithms, including those using, e.g., loss-function optimization and/or back-propagation techniques for determining the current performance of the model and making adjustments to the CNN/DCNN accordingly to improve future performance.

In particular embodiments, the machine-learning model may include several CNNs, the outputs of which may be configured to be input into the DCNN (as previously described, the encoder and decoder may alternatively include any suitable combination of different types of neural networks with varying components). Each of the CNNs may be configured to process a particular type(s) of data. For example, if the training sample includes both camera data and LiDAR data, the camera data (and associated metadata) may be input into a first CNN and the LiDAR data (and associated metadata) may be input into a second CNN. In a similar manner, additional data types may be input into additional CNNs. In other words, each CNN may be tailored to learn to process a particular type or types of data. In particular embodiments, the machine-learning model may be configured so that the outputs of respective CNNs are pooled. For example, if a machine-learning model has k CNNs (e.g., $CNN_1$ to $CNN_k$) with k respective vector outputs (e.g., $V_1$ to $V_k$), the k vectors may be pooled or concatenated (e.g., $[V_1 \ldots V_k]$) to form the latent representation. This latent representation of the inputs of all k CNNs may then be input into the DCNN, which in turn may generate the map data (e.g., step 530). Thereafter, the system may update the model parameters based on the generated map data and the target map data, as previously described.

In particular embodiments, the system, at step 550, may determine whether training of the machine-learning model is complete or should be terminated. The determination may be based on comparisons between the generated map data and the target map data, as measured by a loss function and/or a convergence function. A score representing the comparison may be generated and compared with a threshold requirement, the satisfaction of which may cause the training to terminate. Additionally or alternatively, training may be deemed complete when a threshold number of training samples have been processed and/or a threshold amount of training time has been expended. If the system determines that training is incomplete, the system may repeat another iteration of the training process, starting at, e.g., step 510 and have the machine-learning model learn from another training sample. On the other hand, if the system determines that training is complete, the trained model may then be used in operation to automatically process data from data-gathering vehicles and generate latent representations and/or map data.

While the above description with respect to FIG. 5 uses supervised machine learning as an example, one of ordinary skill in the art would appreciate that other suitable learning techniques may additionally or alternatively be employed, such as unsupervised machine learning and semi-supervised machine learning. For example, with a very large training data set, unsupervised machine-learning techniques may be used to train a machine-learning model to identify feature patterns predictive of the desired output, even though the training data is not labeled. In cases where some labeled training data is available, semi-supervised machine-learning techniques may be used to further refine and improve training results obtained using unlabeled training data.

Starting from step 560, FIG. 5 illustrates a process for using the trained machine-learning model to generate HD maps. In particular embodiments, the computing system may, at step 560, access sensor data obtained using a sensor of a vehicle at a geographic location. The sensor data may be, for example, LiDAR data obtained by a LiDAR sensor of a particular data-gathering vehicle when it drove through a particular geographic location. The data-gathering vehicle may have also gathered other types of sensor data (e.g., camera data, radar data, environmental data, etc.) at the particular geographic location using suitable sensors. The data gathered at that particular geographic location, along with any associated metadata of information relating to the sensors used (e.g., LiDAR, camera, etc.), may be input into the trained machine-learning model. In particular embodiments, the types of data input into the trained machine-learning model may be a subset (including the entire set) of the types of data used to train the model. For example, if a machine-learning model was trained using only camera data, LiDAR data, radar data, and associated metadata, the model in operation may be used to process the same type of data or a subset thereof.

At step 570, the computing system may generate map data by processing the accessed sensor data (e.g., LiDAR data) and associated metadata using the training machine-learning model. As indicated above, the machine-learning model may also process additional types of data (e.g., camera and/or radar) gathered by the data-gathering vehicle at the same geographic location. In particular embodiments where the trained machine-learning model includes a CNN coupled to a DCNN, the sensor data (and any other associated data) may be processed by the trained CNN, which may generate a corresponding latent representation of the input data. The latent representation may then be processed by the trained DCNN, which may generate corresponding map data for the particular location at which the sensor data was gathered.

In particular embodiments, the computing system may use the generated map data, which may be associated with a particular location, to generate or update a portion of an HD map of a region. For example, at step 580, the system may associate the generated map data with the particular location in an HD map. For instance, if the generated map data is associated with sensor data gathered at a particular longitude and latitude, the corresponding location in the HD map may be associated with the generated map data. Thus, when the HD map is being used, the system using the HD map (e.g., an autonomous vehicle) may query for data associated with that longitudinal-latitudinal coordinate to retrieve the generated map data.

At step 590, the system may determine whether the HD map is complete. In particular embodiments, an HD map may be deemed complete when every coordinate associated with drivable roads within a region of interest is associated with generated map data and/or pre-existing map data (e.g., in the case where the generated map data is being used to supplement or complete an existing HD map, rather than building an HD map from scratch). If the HD map is not yet complete, the system may return to step 560 to access an additional data set gathered at another location to generate corresponding map data for the HD map. This process may continue until the HD map is complete with respect to serving a particular purpose. For example, an HD map may be considered as complete when it has map data for every drivable street within a geographic region. As another example, an HD map may be considered as complete when it has sufficient map data along a route to help an autonomous vehicle navigate from a source location to a destination location, even if map data is not available for every street along the route or in a region containing the route. Once the HD map is complete, it may be provided to any computing device that may benefit from or be interested in using the HD map. For example, at step 595, the system may transmit the HD map to autonomous vehicles so that they may use the HD map to drive and navigate. As another example, the HD map may be hosted by a server or on a cloud, through which client systems (e.g., web browsers, mobile devices, autonomous vehicles) may query for map data for particular locations of interest.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for generating an HD map including the particular steps of the method of FIG. 5, this disclosure contemplates any suitable method for generating an HD map, including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
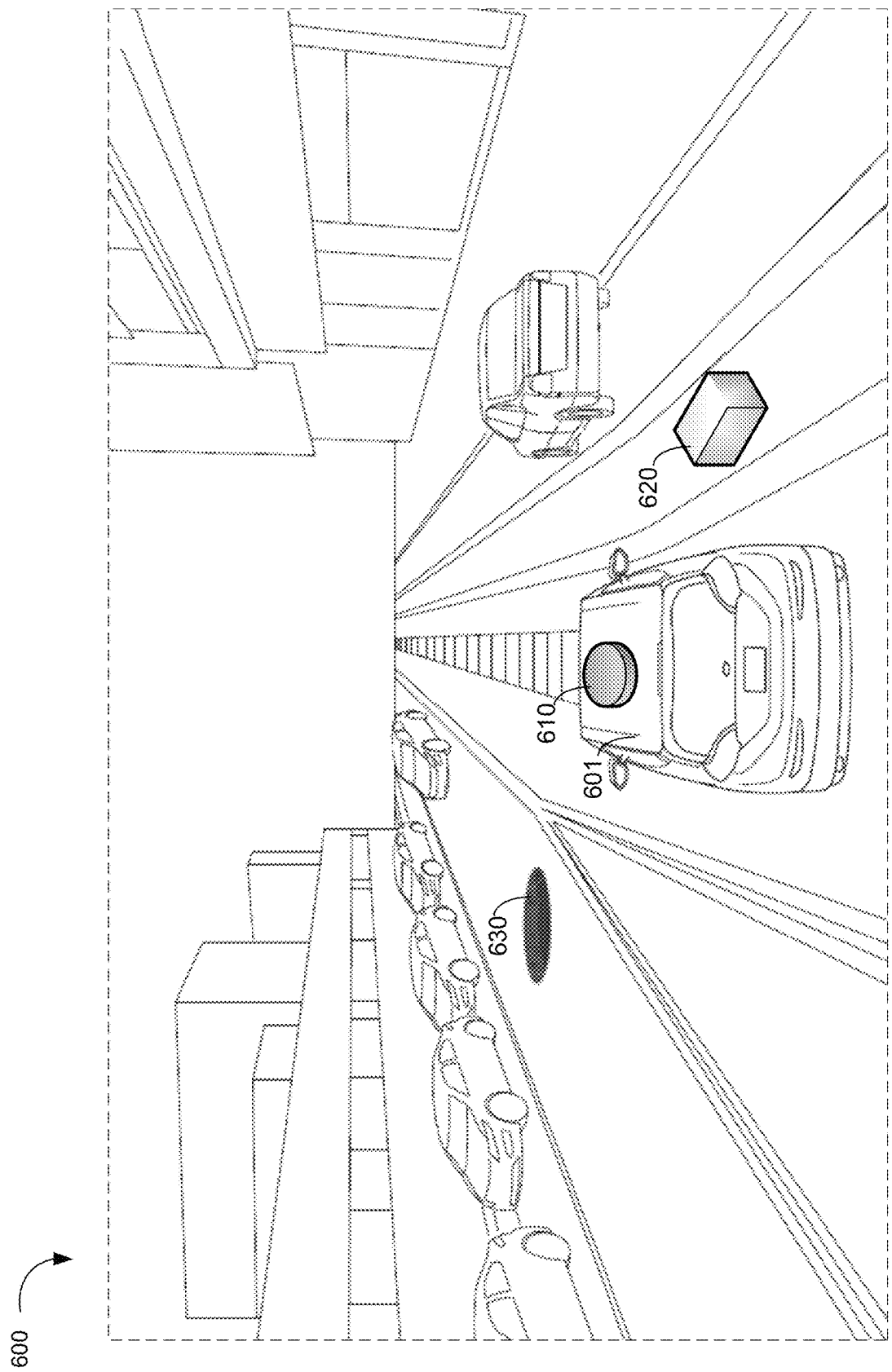
FIG. 6 illustrates an example scenario in which additional objects are detected at a particular location.

Particular embodiments described herein relates to how an HD map may be updated periodically in real-time using gathered sensor data. As previously described, autonomous vehicles may rely on the accuracy of HD maps to safely drive. As such, if the HD map is inaccurate, the driving capabilities and safety of an autonomous vehicle may be compromised. Since the real world modeled by the HD map may change, the HD map would need to be updated as well to reflect the change in the real world. FIG. 6 illustrates a scenario 600 in which the real world has changed. Compared to what it was before in FIG. 2, the road shown in FIG. 6 now includes a box 620 and a pothole 630. The HD map guiding the autonomous vehicle 601 driving through may only reflect the world as shown in FIG. 2, and as such the lack of information about the new hazards 620, 630 may compromise the safety of the autonomous vehicle 601. Although the autonomous vehicle's 601 sensor(s) 610 may be able to help the vehicle 601 detect and avoid such hazards 620, 630, detection may require the vehicle 601 to be sufficiently close to the hazards 620, 630, depending on the range of the sensors. It would be more ideal for the vehicle to know in advance of the hazards 620, 630 to provide ample time to respond to them. In particular embodiments, whether the discovery of a new object would trigger the HD map to be updated may depend on the classification of the new object (e.g., as previously described, the machine-learning model may output map data with labeled objects). For example, the HD map may not be updated if the object is classified as being a person, an animal, a car, or any other object that is likely to move on its own. As another example, the HD map may be updated if the object is classified as a pothole, a broken-down car (e.g., a stationary car with emergency lights on), a fallen tree branch, or any other inanimate object that is likely to remain stationary. In particular embodiments, inanimate objects may be detected based on a determination that data gathered at a particular location by different vehicles at different times within a time frame (e.g., 1 minute, 5 minutes, 30 minutes, etc.) consistently include the same new object, which may indicate that the object is inanimate and may continue to remain in the street. As such, the object may be considered as a hazard, which may warrant the HD map to be updated.

Figure 7:
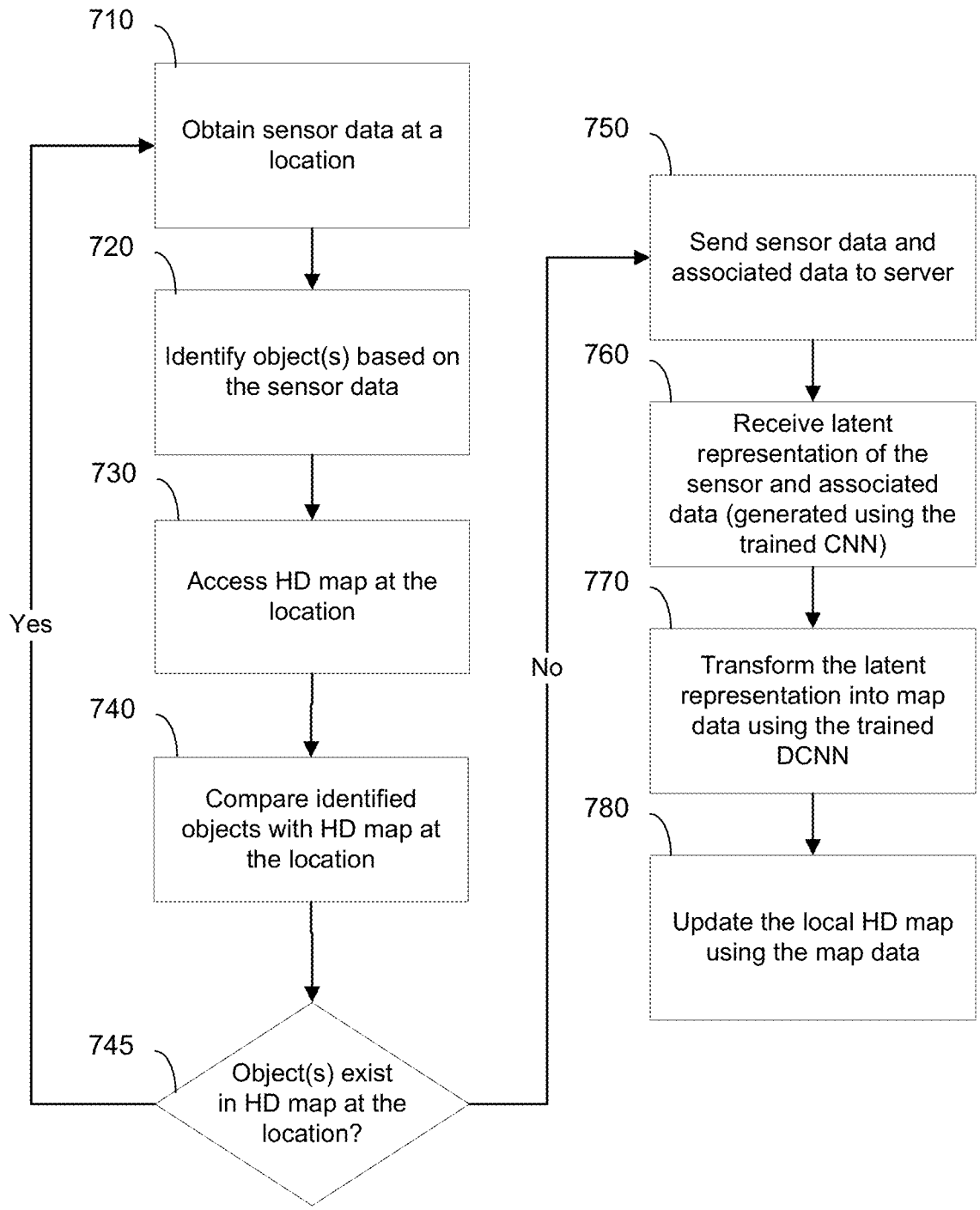
FIG. 7 illustrates an example method for updating HD maps of autonomous vehicles.

To address the likely possibility of road conditions changing, particular embodiments described herein provide a process for updating an HD map, such as the one illustrated in FIG. 7. The process may begin at step 710, at which a computing system of an autonomous vehicle driving on a road may obtain sensor data at a particular location (e.g., corresponding to an x latitude and y longitude). The sensor data may be the aforementioned camera data, LiDAR data, radar data, and/or any other types of sensor data.

At step 720, the computing system of the autonomous vehicle may process the sensor data to identify any objects of interest. In particular embodiments, the autonomous vehicle may use an object classifier to process the sensor data to detect and identify objects. Using the scenario depicted in FIG. 6 as an example, the object classifier, based on the sensor data (e.g., camera or LiDAR data), may detect the existence of the objects (i.e., the box 620 and the pothole 630) in the road, as well as other objects such as buildings, road dividers, sidewalks, etc. In particular embodiments, the object classifier may further label the detected objects by classification type (e.g., the box 620 and pothole 630 may be specifically labeled as such, or generally labeled as debris).

At step 730, the computing system may access the HD map stored on the autonomous vehicle for map data associated with the particular location (e.g., x, y coordinates). Then at step 740, the computing system may compare the map data associated with the location (e.g., x, y coordinates) with the object detected in step 720 to determine whether the detected objects exist in the map data. For example, for each detected object, the system may check whether that object exists in the map data. In particular embodiments, the system may generate a confidence score representing the likelihood of the detected object being accounted for in the map data. The confidence score may be based on, for example, a similarity comparison of the measured size, dimensions, classification, and/or location of the detected object with known objects in the map data. At step 745, if the comparison results in a determination that the detected object(s) exists or is known in the HD map (e.g., the confidence score in the object existing in the map is higher than a threshold), then the system may not perform any map-updating operation and return to obtaining sensor data (e.g., step 710). On the other hand, if the comparison results in a determination that at least one detected object does not exist or is not known in the HD map (e.g., the confidence score in the object existing in the map is lower than a threshold), then the system may proceed with a map-updating operation.

The map-updating operation may begin at step 750, where the system may send sensor data and associated data gathered at that particular location to a server. In particular embodiments, the server may be associated with a transportation management system that manages a fleet of autonomous vehicles. In particular embodiments, the transmitted data may be the raw data obtained from the sensors or processed by-product data that represent the underlying raw data (the latter approach may have the advantage of reducing the amount of data transferred). The data transmitted to the server may be processed by the server to determine whether there is indeed a mismatch between the existing HD map and the current sensor measurement of the world. In particular embodiments, the server may also perform a comparison of the received data (and any objects detected therefrom) with a server-copy of the HD map to determine whether a mismatch exists. In particular embodiments, the server may also use data from other vehicles that have pass through the same location to determine whether the mismatch is consistent across data from different vehicles. In particular embodiments, the server may convert the data received from the vehicle into a latent representation, using the trained CNN described elsewhere herein, and compare the latent representation to a stored latent representation that reflects the HD map's current (not yet updated) model at that particular location. In particular embodiments, the server may transform the received data into generated map data, using the trained machine-learning model (e.g., CNN(s) and DCNN) described elsewhere herein, and compare the generated map data with the corresponding map data in the current HD map. If no mismatch is detected, the server may decide to not update the HD map. On the other hand, if the server determines that the current HD map does not include the detected object, the server may update the server-copy of the HD map as well as the local copies of the HD map on autonomous vehicles. In particular embodiments, the server may prioritize updating the HD maps of vehicles that would most likely be impacted by the HD map update. For example, the server may prioritize autonomous vehicles that are in the region (e.g., within a threshold distance) of where the new object is detected or have trajectories that would result in the vehicles being in that region in the near future.

An autonomous vehicle may update its HD map data in a variety of ways. In the embodiment shown in FIG. 7, the autonomous vehicle, at step 760, may receive a latent representation of the data transmitted to the server at step 750. In this case, the server may have generated the latent representation using the trained CNN, described elsewhere herein. Since the latent representation is in a common latent space for all the autonomous vehicles in the fleet, any autonomous vehicle may use it to update its map without needing to worry about particular sensor configurations/types used for obtaining the underlying sensor data. At step 770, the computing system of the autonomous vehicle may transform the latent representation into map data using the trained DCNN, described elsewhere herein. In particular embodiments, the autonomous vehicle may have received the trained DCNN from the server. Thereafter, at step 780, the computing system may update the local copy of the HD map using the generated map data (e.g., replacing the existing map data at the particular location with the generated map data). In particular embodiments, the local copy of the HD map may be from a third-party (e.g., commercially available map, such as the one that may be used as the target map data described with reference to FIG. 5) or may be generated using embodiments described herein.

In another embodiment (not illustrated), instead of receiving a latent representation (e.g., step 760 in FIG. 7), the autonomous vehicle may receive generated map data from the server and use it to replace its counterpart in the local HD map. In other words, instead of the autonomous vehicle performing the operation of transforming the latent representation into the generated map data, the server may perform this task and then send the updated map data to the autonomous vehicle. One advantage of having the server perform the transformation is that the server computer (which may have more processing power than the computing system of autonomous vehicles) would only need to do it once, rather than having every autonomous vehicle perform the transformation locally. Further, the DCNN would not need to be transmitted to the autonomous vehicles, which makes updating the DCNN simpler (as an update would be limited to server-side update and not client-side updates). However, a tradeoff with this approach is that the generated map data may be significantly larger than the latent representation, and as such transmitting the generated map data would be much more taxing on network resources.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for updating HD map including the particular steps of the method of FIG. 7, this disclosure contemplates any suitable method for updating HD map, including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
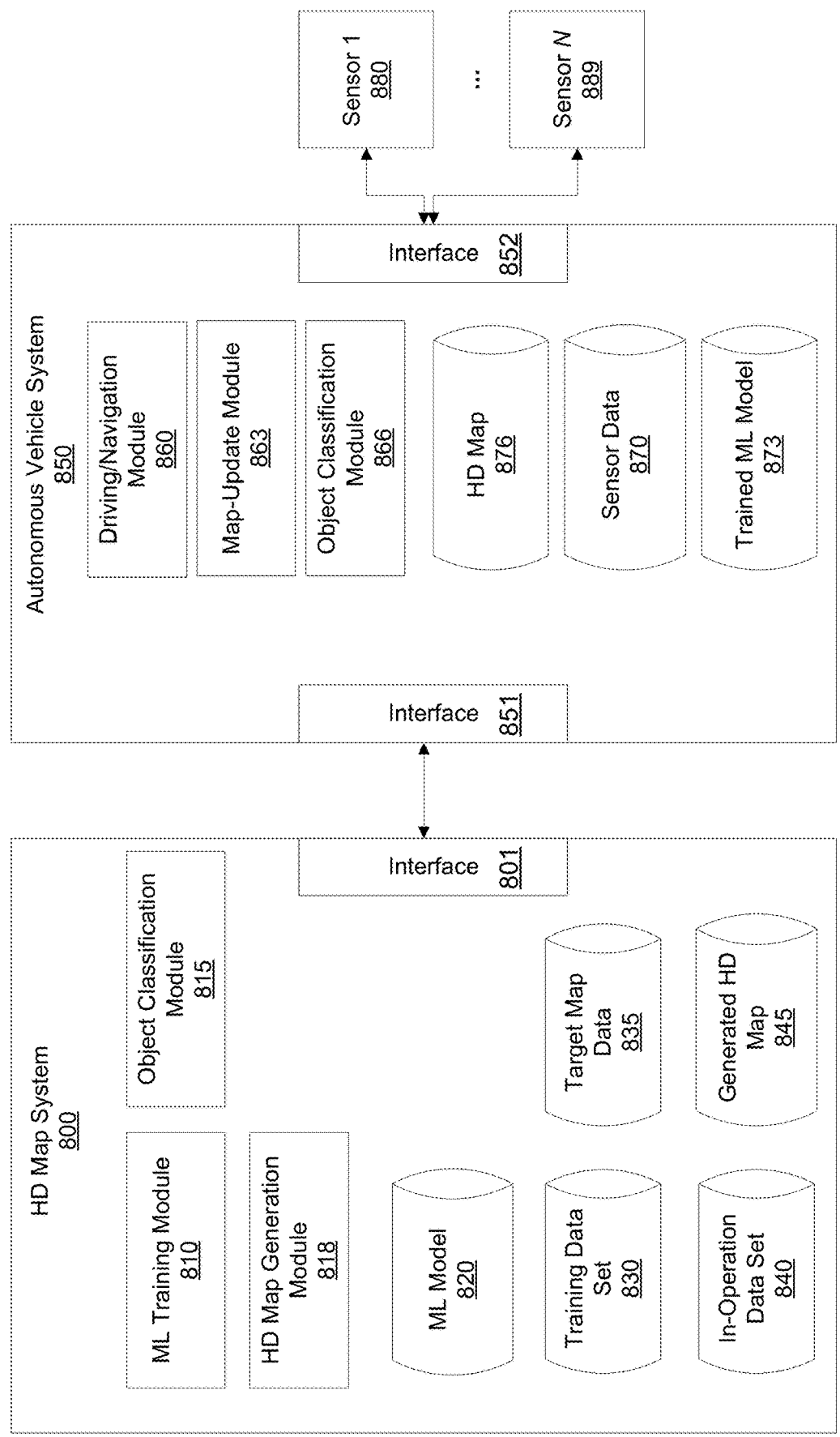
FIG. 8 illustrates and example block diagram of a training system and an autonomous vehicle system.

FIG. 8 illustrates an example block diagram of a HD Map System 800 and an autonomous vehicle system 850 in accordance with particular embodiments described herein. In particular embodiments, the HD Map System 800 may be any computing system, distributed or otherwise, configured to train a machine-learning model and use the model to generate an HD map, in accordance with embodiments described herein. In particular embodiments, the system 800 may be part of, controlled by, or otherwise associated with a transportation management system that manages a fleet of autonomous vehicles, as described elsewhere herein. The system 800 may be equipped with any number and any combination of central processing units, graphics processing units, memory, storage, and other hardware resources. While FIG. 8 illustrates the system 800 as being a single computing system, the system 800 may also be multiple, separate computing systems. The multiple computing systems may be separately tasked to, e.g., train the machine-learning model, generate the HD map, and communicate and distribute data (e.g., HD map and/or map updates) to the autonomous vehicles.

In particular embodiments, the HD Map System 800 may include or have access to one or more data stores. For example, an ML Model data store 820 may store the machine-learning model that is to be trained and used for generating HD maps. The ML Model data store 820 may store the architecture of the machine-learning model along with its parameters. During training, the stored machine-learning model may be iteratively updated until training is complete. The trained machine-learning model may be distributed to other systems for use in operation. This may include, e.g., another computing system tasked to use the trained machine-learning model to generate an HD map. In particular embodiments, the trained machine-learning model may also be distributed to autonomous vehicles so that they may transform sensor data to latent representations and/or transform latent representations to map data, as described elsewhere herein.

The HD Map System 800 may also include or have access to data stores for storing a training data set 830 and target map data 835. Conceptually, the training data set 830 may be considered as the independent variables of a machine-learning model and the target map data 835 may be the dependent variables. As described elsewhere herein, the training data set 830 may include a large number of training samples, each including sensor data obtained at a particular geographic location, along with relevant associated information (e.g., metadata describing the relevant sensor's configurations, environmental data, etc.). Each training sample may have corresponding target map data 835 associated with a particular geographic location. The target map data 835 may be obtained, for example, from an existing HD map. An objective of the training process is to train the machine-learning model 820 to learn to output map data sufficiently similar to the target map data 835 based on data having features similar to that of the training sample.

Additionally, the HD Map System 800 may include or have access to a data store containing in-operation data set 840 used for generating the HD map. The in-operation data set 840 may include any number of data instances, each associated with a particular geographic location. Each data instance may include data types that are similar to those in a training sample in the training data set 830. For example, a data instance in the in-operation data set 840 may include sensory data obtained by one or more sensors at a particular geographic location, along with associated data (e.g., metadata describing the relevant sensor's configurations, environmental data, etc.). The in-operation data set 840 may be configured to be processed by the trained machine-learning model in the ML Model data store 820 and used to generate corresponding map data used for generating the desired HD map, which may be updated and stored in the Generated HD Map data store 845. Once the HD map has been generated, it may be distributed to, e.g., autonomous vehicles to assist with driving and navigation operations.

In particular embodiments, the HD Map System 800 may include one or more modules configured with logic (e.g., implemented in software, firmware, or hardware) for performing operations associated with generating the HD map. For example, the system 800 may include a machine-learning (ML) training module 810 configured to train the machine-learning model 820 used for generating the HD map 845. The ML training module 810 may include any suitable training algorithm, such as those for supervised learning (e.g., back-propagation neural networks, logistic regression), unsupervised learning (e.g., k-Means, a priori algorithm), and/or semi-supervised learning. The ML training module 810 may be configured to perform the training using the training data set 830 and the target map data 835. In particular embodiments where the machine-learning model 820 is configured to also receive object classifications as input (further details described elsewhere herein), the ML training module 810 may utilize one or more object classification modules 815, which may also be stored in a data store accessible to the system 800. The object classification modules may be machine-learning classifiers trained to detect and classify particular objects (e.g., roads, debris, curbs, etc.) captured in sensor data (e.g., images, videos, LiDAR data).

In particular embodiments, the HD Map System 800 may further include an HD map generation module 818 configured to use the training machine-learning model 820 to generate the HD map 845. For example, the HD map generation module may be configured to access in-operation data 840, generate map data by processing the in-operation data 840 using the trained machine-learning model 820, and generating the HD map 845 using the generated map data. As described in further detail herein, each instance of the in-operation data 840 and the corresponding generated map data may be associated with a geographic location. The HD map generation module 818 may associate each instance of generated map data with its associated location in the HD map 845.

In particular embodiments, the HD Map System 800 may further include an interface 801 for communicating with one or more autonomous vehicle systems 850. The interface 801 may support any suitable communication protocols, including, e.g., physical layer, data link layer, network layer, transport layer, session layer, presentation layer, and/or application layer protocols. Through the interface 801, the system 800 may receive sensor data, associated metadata, and/or environmental data from individual data-gathering vehicles or autonomous vehicles. Through the interface 801, the system 800 may also send instructions to an autonomous vehicle system 850 to update local HD map, HD map 845 or portions thereof (e.g., map data associated with a particular location), latent representations of map data, and/or the trained machine-learning model 820 or portions thereof (e.g., the CNN and/or the DCNN).

In particular embodiments, the autonomous vehicle system 850 may be a computing system integrated with an autonomous vehicle, having processing units (e.g., central processing units and/or graphics processing units), memory, storage, and any other suitable hardware resources. The autonomous vehicle system 850 may include an interface 851 for communicating with the HD Map System 800, as well as an interface 852 for communicating with one or more sensors (e.g., cameras, LiDAR, radar, etc.) 880, 889 transported by the autonomous vehicle. The interfaces 851, 852 may each support suitable communication protocols for interfacing with their respective systems, including, e.g., physical layer, data link layer, network layer, transport layer, session layer, presentation layer, and/or application layer protocols.

In particular embodiments, the autonomous vehicle system 850 may include a driving/navigation module 860 for controlling the autonomous vehicle's driving and navigation functions. The driving/navigation module 860 may be configured to access a local HD map stored in an HD map data sore 876. In particular embodiments, the local HD map may be generated or updated using embodiments described herein, or it may be from a third-party map provider.

In particular embodiments, the autonomous vehicle system 850 may include a map-update module 863 configured to update the local HD map 876 according to particular embodiments described herein. In particular embodiments, the autonomous vehicle system 850 may obtain sensor data from the vehicle's sensors 880, 889 while the vehicle is driving and store the sensor data in a data store 870. The map-update module 863 may be configured to access the stored sensor data 870 and use an object classification module 866 to detect and classify objected within the sensor data 870. As described in further detail elsewhere herein, the object classification results may be compared to the HD map data 876 to determine whether the detected objects are known in the HD map. If the HD map 876 does not include the object, the HD map 876 may be updated in accordance with embodiments described herein. In particular embodiments where the autonomous vehicle system 850 is configured to generate the updated map data, it may process the relevant sensor data 870 using the trained machine-learning model 873 to generate the updated map data. In particular embodiments where the autonomous vehicle system 850 obtains latent representations from the HD Map System 800, the autonomous vehicle system 850 may transform the latent representation into map data using the trained machine-learning model 873 (e.g., using the trained DCNN, as described in further detail elsewhere herein). In particular embodiments where the autonomous vehicle system 850 receives updated map data from the HD Map System 800 and no local transformation is performed, the autonomous vehicle system 850 may not store the training machine-learning model 873. Once updated, the HD map data 876 may continue to be used by the driving/navigation module 860 to assist with the vehicle's autonomous driving operations.

Figure 9:
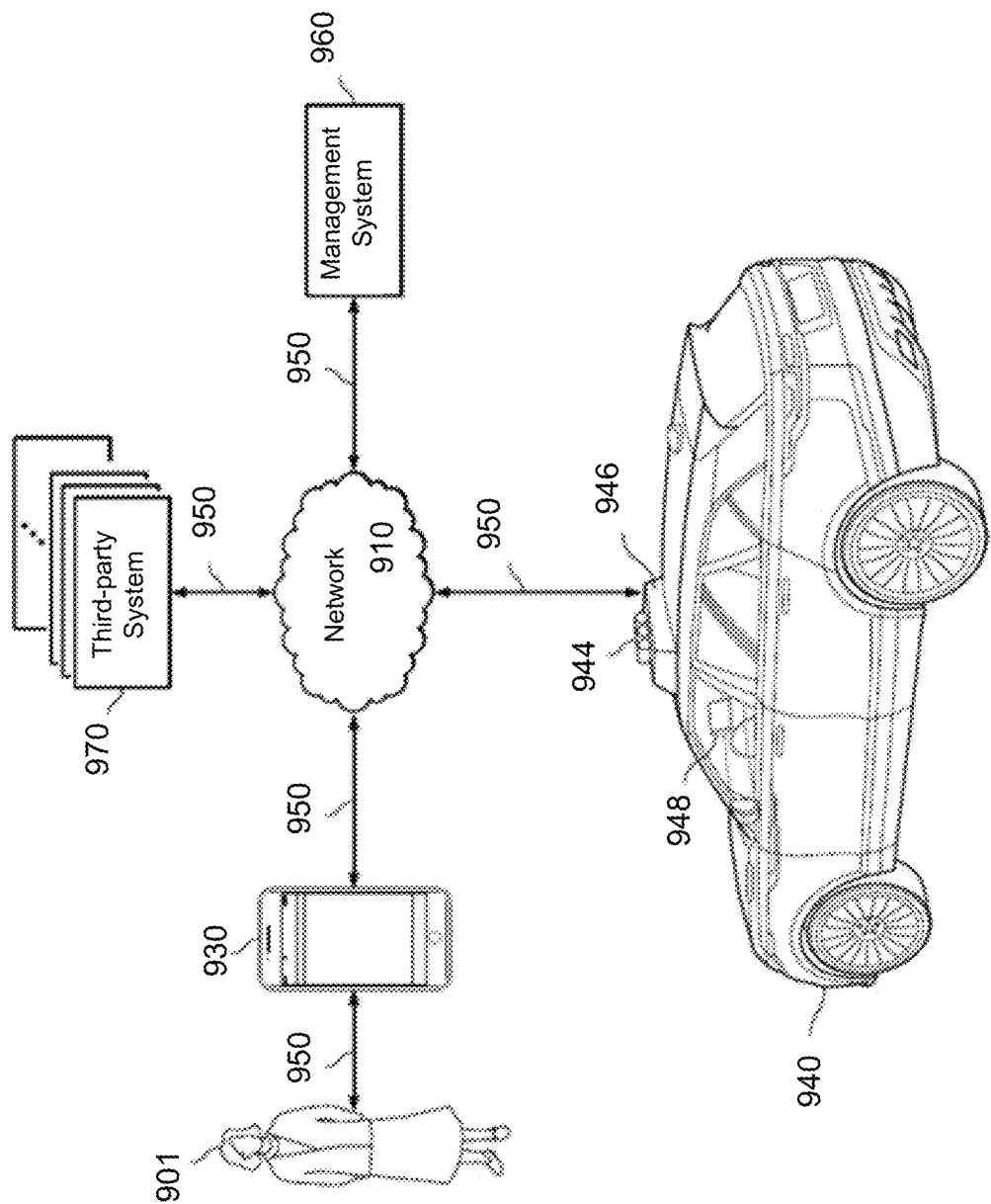
FIG. 9 illustrates an example block diagram of a transportation management environment for matching ride requestors with autonomous vehicles and distributing map data.

FIG. 9 illustrates an example block diagram of a transportation management environment for matching ride requestors with autonomous vehicles. In particular embodiments, the environment may include various computing entities, such as a user computing device 930 of a user 901 (e.g., a ride provider or requestor), a transportation management system 960, an autonomous vehicle 940, and one or more third-party system 970. The computing entities may be communicatively connected over any suitable network 910. As an example and not by way of limitation, one or more portions of network 910 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 9 illustrates a single user device 930, a single transportation management system 960, a single vehicle 940, a plurality of third-party systems 970, and a single network 910, this disclosure contemplates any suitable number of each of these entities. As an example and not by way of limitation, the network environment may include multiple users 901, user devices 930, transportation management systems 960, autonomous-vehicles 940, third-party systems 970, and networks 910.

The user device 930, transportation management system 960, autonomous vehicle 940, and third-party system 970 may be communicatively connected or co-located with each other in whole or in part. These computing entities may communicate via different transmission technologies and network types. For example, the user device 930 and the vehicle 940 may communicate with each other via a cable or short-range wireless communication (e.g., Bluetooth, NFC, WI-FI, etc.), and together they may be connected to the Internet via a cellular network accessible to either one of the devices (e.g., the user device 930 may be a smartphone with LTE connection). The transportation management system 960 and third-party system 970, on the other hand, may be connected to the Internet via their respective LAN/WLAN networks and Internet Service Providers (ISP). FIG. 9 illustrates transmission links 950 that connect user device 930, autonomous vehicle 940, transportation management system 960, and third-party system 970 to communication network 910. This disclosure contemplates any suitable transmission links 950, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 950 may connect to one or more networks 910, which may include in part, e.g., ad hoc network, the Intranet, extranet, VPN, LAN, WLAN, WAN, WWAN, MAN, PSTN, a cellular network, a satellite network, or any combination thereof. The computing entities need not necessarily use the same type of transmission link 950. For example, the user device 930 may communicate with the transportation management system via a cellular network and the Internet, but communicate with the autonomous vehicle 940 via Bluetooth or a physical wire connection.

In particular embodiments, the transportation management system 960 may fulfill ride requests for one or more users 901 by dispatching suitable vehicles. The transportation management system 960 may receive any number of ride requests from any number of ride requestors 901. In particular embodiments, a ride request from a ride requestor 901 may include an identifier that identifies the ride requestor in the system 960. The transportation management system 960 may use the identifier to access and store the ride requestor's 901 information, in accordance with his/her privacy settings. The ride requestor's 901 information may be stored in one or more data stores (e.g., a relational database system) associated with and accessible to the transportation management system 960. In particular embodiments, ride requestor information may include profile information about a particular ride requestor 901. In particular embodiments, the ride requestor 901 may be associated with one or more categories or types, through which the ride requestor 901 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 960 may classify a user 901 based on known information about the user 901 (e.g., using machine-learning classifiers), and use the classification to retrieve relevant aggregate information associated with that class. For example, the system 960 may classify a user 901 as a young adult and retrieve relevant aggregate information associated with young adults, such as the type of music generally preferred by young adults.

Transportation management system 960 may also store and access ride information. Ride information may include locations related to the ride, traffic data, route options, optimal pick-up or drop-off locations for the ride, or any other suitable information associated with a ride. As an example and not by way of limitation, when the transportation management system 960 receives a request to travel from San Francisco International Airport (SFO) to Palo Alto, California, the system 960 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 960. For example, historical data may include aggregate information generated based on past ride information, which may include any ride information described herein and telemetry data collected by sensors in autonomous vehicles and/or user devices. Historical data may be associated with a particular user (e.g., that particular user's preferences, common routes, etc.), a category/class of users (e.g., based on demographics), and/or all users of the system 960. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to news, etc. As yet another example, historical data associated with all users may include general usage trends, such as traffic and ride patterns. Using historical data, the system 960 in particular embodiments may predict and provide ride suggestions in response to a ride request. In particular embodiments, the system 960 may use machine-learning, such as neural-networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and/or semi-supervised learning based on a mixture of labeled and unlabeled training data.

In particular embodiments, transportation management system 960 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 960 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or other suitable database system. Although this disclosure describes or illustrates particular types of databases, this disclosure contemplates any suitable types of databases. Particular embodiments may provide interfaces that enable a user device 930 (which may belong to a ride requestor or provider), a transportation management system 960, vehicle system 940, or a third-party system 970 to process, transform, manage, retrieve, modify, add, or delete the information stored in data store.

In particular embodiments, transportation management system 960 may include an authorization server (or other suitable component(s)) that allows users 901 to opt-in to or opt-out of having their information and actions logged, recorded, or sensed by transportation management system 960 or shared with other systems (e.g., third-party systems 970). In particular embodiments, a user 901 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 901 of transportation management system 960 through blocking, data hashing, anonymization, or other suitable techniques as appropriate.

In particular embodiments, third-party system 970 may be a network-addressable computing system that may provide HD maps or host GPS maps, customer reviews, music or content, weather information, or any other suitable type of information. Third-party system 970 may generate, store, receive, and send relevant data, such as, for example, map data, customer review data from a customer review website, weather data, or any other suitable type of data. Third-party system 970 may be accessed by the other computing entities of the network environment either directly or via network 910. For example, user device 930 may access the third-party system 970 via network 910, or via transportation management system 960. In the latter case, if credentials are required to access the third-party system 970, the user 901 may provide such information to the transportation management system 960, which may serve as a proxy for accessing content from the third-party system 970.

In particular embodiments, the transportation management system 960 or third-party system 970 may include or be part of the training system 800 described with reference to FIG. 8, or the transportation management system 960 or third-party system 970 may be communicatively connected to the training system 800 and/or its data stores (e.g., the ML model data store 820, HD map data store 845, etc.). In particular embodiments, through the network 910, the transportation management system 960 or third-party system 970 may receive sensor data, associated metadata, object classifications, and/or environmental data from the autonomous vehicles 940. In particular embodiments, the transportation management system 960 or third-party system 970 may also send autonomous vehicles 940 an HD map, map data associated with a particular location, latent representation of data associated with a particular location, and/or instructions for local map updates.

In particular embodiments, user device 930 may be a mobile computing device such as a smartphone, tablet computer, or laptop computer. User device 930 may include one or more processors (e.g., CPU and/or GPU), memory, and storage. An operation system and applications may be installed on the user device 930, such as, e.g., a transportation application associated with the transportation management system 960, applications associated with third-party systems 970, and applications associated with the operating system. User device 930 may include functionality for determining its location, direction, or orientation, based on integrated sensors such as GPS, compass, gyroscope, or accelerometer. User device 930 may also include wireless transceivers for wireless communication, and may support wireless communication protocols such as Bluetooth, near-field communication (NFC), infrared (IR) communication, WI-FI, and/or 2G/3G/4G/LTE mobile communication standard. User device 930 may also include one or more cameras, scanners, touchscreens, microphones, speakers, and any other suitable input-output devices.

In particular embodiments, the vehicle 940 may be an autonomous vehicle and equipped with an array of sensors 944, a navigation system 946, and a ride-service computing device 948. In particular embodiments, a fleet of autonomous vehicles 940 may be managed by the transportation management system 960. The fleet of autonomous vehicles 940, in whole or in part, may be owned by the entity associated with the transportation management system 960, or they may be owned by a third-party entity relative to the transportation management system 960. In either case, the transportation management system 960 may control the operations of the autonomous vehicles 940, including, e.g., dispatching select vehicles 940 to fulfill ride requests, instructing the vehicles 940 to perform select operations (e.g., head to a service center or charging/fueling station, pull over, stop immediately, self-diagnose, lock/unlock compartments, change music station, change temperature, and any other suitable operations), and instructing the vehicles 940 to enter select operation modes (e.g., operate normally, drive at a reduced speed, drive under the command of human operators, and any other suitable operational modes).

In particular embodiments, the autonomous vehicles 940 may receive data from and transmit data to the transportation management system 960 and the third-party system 970. Example of received data may include, e.g., instructions, new software or software updates, maps, 3D models, trained or untrained machine-learning models, location information (e.g., location of the ride requestor, the autonomous vehicle 940 itself, other autonomous vehicles 940, and target destinations such as service centers), navigation information, traffic information, weather information, entertainment content (e.g., music, video, and news) ride requestor information, ride information, and any other suitable information. Examples of data transmitted from the autonomous vehicle 940 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 940, passengers may send/receive data to the transportation management system 960 and/or third-party system 970), and any other suitable data.

In particular embodiments, autonomous vehicles 940 may also communicate with each other as well as other traditional human-driven vehicles, including those managed and not managed by the transportation management system 960. For example, one vehicle 940 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) and/or over a network (e.g., the Internet or via the transportation management system 960 or third-party system 970).

In particular embodiments, an autonomous vehicle 940 may obtain and process sensor/telemetry data. Such data may be captured by any suitable sensors. For example, the vehicle 940 may have aa Light Detection and Ranging (LiDAR) sensor array of multiple LiDAR transceivers that are configured to rotate 360°, emitting pulsed laser light and measuring the reflected light from objects surrounding vehicle 940. In particular embodiments, LiDAR transmitting signals may be steered by use of a gated light valve, which may be a MEMs device that directs a light beam using the principle of light diffraction. Such a device may not use a gimbaled mirror to steer light beams in 360° around the autonomous vehicle. Rather, the gated light valve may direct the light beam into one of several optical fibers, which may be arranged such that the light beam may be directed to many discrete positions around the autonomous vehicle. Thus, data may be captured in 360° around the autonomous vehicle, but no rotating parts may be necessary. A LiDAR is an effective sensor for measuring distances to targets, and as such may be used to generate a three-dimensional (3D) model of the external environment of the autonomous vehicle 940. As an example and not by way of limitation, the 3D model may represent the external environment including objects such as other cars, curbs, debris, objects, and pedestrians up to a maximum range of the sensor arrangement (e.g., 50, 100, or 200 meters). As another example, the autonomous vehicle 940 may have optical cameras pointing in different directions. The cameras may be used for, e.g., recognizing roads, lane markings, street signs, traffic lights, police, other vehicles, and any other visible objects of interest. To enable the vehicle 940 to "see" at night, infrared cameras may be installed. In particular embodiments, the vehicle may be equipped with stereo vision for, e.g., spotting hazards such as pedestrians or tree branches on the road. As another example, the vehicle 940 may have radars for, e.g., detecting other vehicles and/or hazards afar. Furthermore, the vehicle 940 may have ultra sound equipment for, e.g., parking and obstacle detection. In addition to sensors enabling the vehicle 940 to detect, measure, and understand the external world around it, the vehicle 940 may further be equipped with sensors for detecting and self-diagnosing the its own state and condition. For example, the vehicle 940 may have wheel sensors for, e.g., measuring velocity; global positioning system (GPS) for, e.g., determining the vehicle's current geolocation; and/or inertial measurement units, accelerometers, gyroscopes, and/or odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieving using any combination of sensors. For example, an autonomous vehicle 940 may build a 3D model of its surrounding based on data from its LiDAR, radar, sonar, and cameras, along with a pre-generated map obtained from the transportation management system 960 or the third-party system 970. Although sensors 944 appear in a particular location on autonomous vehicle 940 in FIG. 9, sensors 944 may be located in any suitable location in or on autonomous vehicle 940. Example locations for sensors include the front and rear bumpers, the doors, the front windshield, on the side paneling, or any other suitable location.

In particular embodiments, the autonomous vehicle 940 may be equipped with a processing unit (e.g., one or more CPUs and GPUs), memory, and storage. The vehicle 940 may thus be equipped to perform a variety of computational and processing tasks, including processing the sensor data, extracting useful information, and operating accordingly. For example, based on images captured by its cameras and a machine-vision model, the vehicle 940 may identify particular types of objects captured by the images, such as pedestrians, other vehicles, lanes, curbs, and any other objects of interest.

In particular embodiments, the autonomous vehicle 940 may have a navigation system 946 responsible for safely navigating the autonomous vehicle 940. In particular embodiments, the navigation system 946 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 946 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 946 may use its determinations to control the vehicle 940 to operate in prescribed manners and to guide the autonomous vehicle 940 to its destinations without colliding into other objects. Although the physical embodiment of the navigation system 946 (e.g., the processing unit) appears in a particular location on autonomous vehicle 940 in FIG. 9, navigation system 946 may be located in any suitable location in or on autonomous vehicle 940. Example locations for navigation system 946 include inside the cabin or passenger compartment of autonomous vehicle 940, near the engine/battery, near the front seats, rear seats, or in any other suitable location.

In particular embodiments, the autonomous vehicle 940 may be equipped with a ride-service computing device 948, which may be a tablet or other suitable device installed by transportation management system 960 to allow the user to interact with the autonomous vehicle 940, transportation management system 960, other users 901, or third-party systems 970. In particular embodiments, installation of ride-service computing device 948 may be accomplished by placing the ride-service computing device 948 inside autonomous vehicle 940, and configuring it to communicate with the vehicle 940 via a wire or wireless connection (e.g., via Bluetooth). Although FIG. 9 illustrates a single ride-service computing device 948 at a particular location in autonomous vehicle 940, autonomous vehicle 940 may include several ride-service computing devices 948 in several different locations within the vehicle. As an example and not by way of limitation, autonomous vehicle 940 may include four ride-service computing devices 948 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 948 may be detachable from any component of autonomous vehicle 940. This may allow users to handle ride-service computing device 948 in a manner consistent with other tablet computing devices. As an example and not by way of limitation, a user may move ride-service computing device 948 to any location in the cabin or passenger compartment of autonomous vehicle 940, may hold ride-service computing device 948 in his/her lap, or handle ride-service computing device 948 in any other suitable manner. Although this disclosure describes providing a particular computing device in a particular manner, this disclosure contemplates providing any suitable computing device in any suitable manner.

Figure 10:
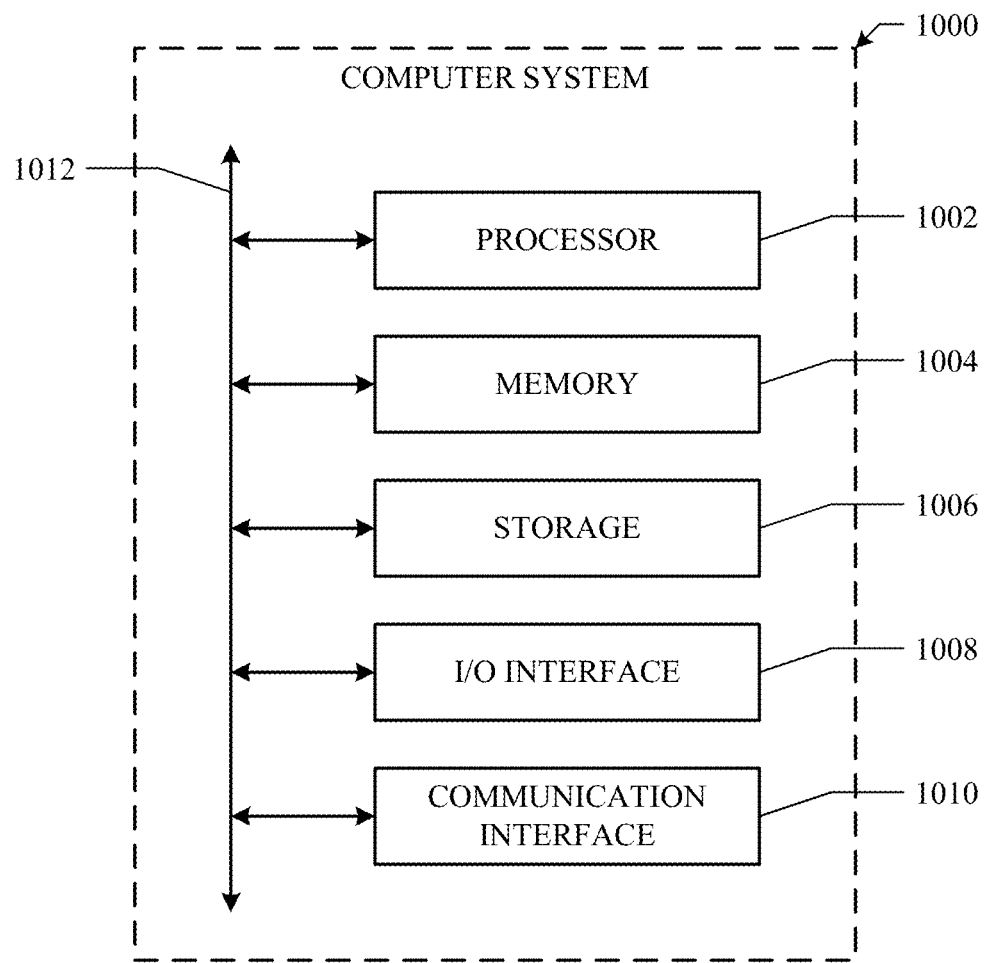
FIG. 10 illustrates an example of a computing system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described in further detail below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:

collecting, by the computing system of a first vehicle, first sensor data, of a particular geographic location, from a first type of sensor of the first vehicle associated with a fleet of vehicles;

processing, by the computing system of the first vehicle, the first sensor data to identify one or more first objects at the particular geographic location;

accessing, by the computing system of the first vehicle, an existing high-definition (HD) map associated with the particular geographic location;

determining, by the computing system of the first vehicle, whether the one or more first objects are included in the existing HD map; and in response to determining that the one or more first objects are not included in the existing HD map, sending, by the computing system of the first vehicle, the first sensor data to a server to transform the first sensor data into a latent representation, wherein transforming the first sensor data into the latent representation comprises:

encoding, using a trained machine-learning model, the first sensor data collected from the first type of sensor of the first vehicle into the latent representation in a common data space to minimize discrepancies between the first sensor data collected from the first type of sensor of the first vehicle and second sensor data collected from a second type of sensor of a second vehicle;

receiving, by the computing system of the first vehicle, the latent representation of the first sensor data from the server;

decoding, by the computing system of the first vehicle, the latent representation to generate map data corresponding to the first sensor data; and associating, by the computing system of the first vehicle, the map data corresponding to the first sensor data with the existing HD map to generate an updated HD map.

2. The method of claim 1, wherein:
the first sensor data comprises camera data and the first type of sensor is a camera sensor; and
the second sensor data comprises light detection and ranging (LiDAR) data and the second type of sensor is a LiDAR sensor.

3. The method of claim 1, wherein the first type of sensor and the second type of sensor are same.

4. The method of claim 1, wherein the first type of sensor and the second type of sensor are different.

5. The method of claim 1, further comprising:
determining that the one or more first objects are inanimate or stationary objects.

6. The method of claim 5, wherein determining that the one or more first objects are inanimate or stationary objects comprises:
receiving additional sensor data, of the particular geographic location, from other vehicles associated with the fleet of vehicles at different times within a certain time frame; and
determining that the one or more first objects identified at the particular geographic location are consistent across the first sensor data associated with the first vehicle, the second sensor data associated with the second vehicle, and the additional sensor data associated with the other vehicles of the fleet of vehicles.

7. The method of claim 1, wherein the trained machine-learning model comprises a convolutional neural network and a deconvolutional neural network, wherein an output of the convolutional neural network is configured to be an input of the deconvolutional neural network.

8. The method of claim 7, wherein:
the encoding the first sensor data into the latent representation is performed using the convolutional neural network; and
the decoding the latent representation is performed using the deconvolutional neural network.

9. The method of claim 1, wherein processing the first sensor data to identify the one or more first objects at the particular geographic location comprises:
detecting a plurality of objects based at least in part on the first sensor data;
classifying, using an object classifier, the plurality of objects into different classification types; and
determining, based on the different classification types, stationary objects from the plurality of objects, wherein the one or more first objects are the stationary objects on a road.

10. The method of claim 1, wherein determining whether the one or more first objects are included in the existing HD map comprises:
generating, for each first object of the one or more first objects, a confidence score representing a likelihood of the first object being included in the existing HD map; and
comparing, for each first object of the one or more first objects, the confidence score with a threshold.

11. The method of claim 10, wherein confidence score generated for the first object is based on one or more of a similarity comparison of a measured size, dimensions, classification, or location of the first object with known objects in the existing HD map.

12. The method of claim 1, wherein determining whether the one or more first objects are included in the existing HD map comprises:
determining whether there is a mismatch between the first sensor data of the particular geographic location and the existing HD map associated with particular geographic location based on comparing map data corresponding to the first sensor data with corresponding map data in the existing HD map.

13. A system, comprising:
one or more processors and one or more computer-readable non-transitory storage media in communication with the one or more processors, the one or more computer-readable non-transitory storage media comprising instructions operable when executed by the one or more processors to cause the system to perform operations comprising:
collecting, by a computing system of a first vehicle, first sensor data, of a particular geographic location, from a first type of sensor of the first vehicle associated with a fleet of vehicles;
processing, by the computing system of the first vehicle, the first sensor data to identify one or more first objects at the particular geographic location;
accessing, by the computing system of the first vehicle, an existing high-definition (HD) map associated with the particular geographic location;
determining, by the computing system of the first vehicle, whether the one or more first objects are included in the existing HD map; and
in response to determining that the one or more first objects are not included in the existing HD map, sending, by the computing system of the first vehicle, the first sensor data to a server to transform the first sensor data into a latent representation, wherein transforming the first sensor data into the latent representation comprises:
encoding, using a trained machine-learning model, the first sensor data collected from the first type of sensor of the first vehicle into the latent representation in a common data space to minimize discrepancies between the first sensor data collected from the first type of sensor of the first vehicle and second sensor data collected from a second type of sensor of a second vehicle;
receiving, by the computing system of the first vehicle, the latent representation of the first sensor data from the server;
decoding, by the computing system of the first vehicle, the latent representation to generate map data corresponding to the first sensor data; and
associating, by the computing system of the first vehicle, the map data corresponding to the first sensor data with the existing HD map to generate an updated HD map.

14. The system of claim 13, wherein:
the first sensor data comprises camera data and the first type of sensor is a camera sensor; and
the second sensor data comprises light detection and ranging (LiDAR) data and the second type of sensor is a LiDAR sensor.

15. The system of claim 13, wherein the first type of sensor and the second type of sensor are different.

16. The system of claim 13, wherein the first type of sensor and the second type of sensor are same.

17. One or more computer-readable non-transitory storage media including instructions that are operable when executed to cause one or more processors to perform operations comprising:

collecting, by a computing system of a first vehicle, first sensor data, of a particular geographic location, from a first type of sensor of the first vehicle associated with a fleet of vehicles;

processing, by the computing system of the first vehicle, the first sensor data to identify one or more first objects at the particular geographic location;

accessing, by the computing system of the first vehicle, an existing high-definition (HD) map associated with the particular geographic location;

determining, by the computing system of the first vehicle, whether the one or more first objects are included in the existing HD map; and in response to determining that the one or more first objects are not included in the existing HD map, sending, by the computing system of the first vehicle, the first sensor data to a server to transform the first sensor data into a latent representation, wherein transforming the first sensor data into the latent representation comprises:

encoding, using a trained machine-learning model, the first sensor data collected from the first type of sensor of the first vehicle into the latent representation in a common data space to minimize discrepancies between the first sensor data collected from the first type of sensor of the first vehicle and second sensor data collected from a second type of sensor of a second vehicle;

decoding, by the computing system of the first vehicle, the latent representation to generate map data corresponding to the first sensor data; and associating, by the computing system of the first vehicle, the map data corresponding to the first sensor data with the existing HD map to generate an updated HD map.

18. The one or more computer-readable non-transitory storage media of claim 17, wherein:

the first sensor data comprises camera data and the first type of sensor is a camera sensor; and the second sensor data comprises light detection and ranging (LiDAR) data and the second type of sensor is a LiDAR sensor.

19. The one or more computer-readable non-transitory storage media of claim 17, wherein the first type of sensor and the second type of sensor are different.

20. The one or more computer-readable non-transitory storage media of claim 17, wherein the first type of sensor and the second type of sensor are same.

* * * * *